United States Patent

Daley et al.

Patent Number: 5,844,899
Date of Patent: Dec. 1, 1998

[54] METHOD AND APPARATUS FOR PROVIDING A CALL IDENTIFIER IN A DISTRUBUTED NETWORK SYSTEM

[75] Inventors: Robert S. Daley, Del Mar; Alejandro R. Holcman, San Diego; Barry R. Robbins, La Jolla; Noam A. Ziv, San Diego, all of Calif.

[73] Assignee: QUALCOMM Incorporated, San Diego, Calif.

[21] Appl. No.: 705,464

[22] Filed: Aug. 29, 1996

[51] Int. Cl.⁶ ................................................ H04J 13/00
[52] U.S. Cl. ........................................ 370/342; 370/389
[58] Field of Search .................................. 370/342, 464, 370/349, 314, 321, 335, 337, 347, 442, 441, 351, 353, 356, 447, 445, 458, 459, 461, 462, 389; 375/200, 205; 379/112, 91.01, 121, 267, 266; 455/31.2

[56] References Cited

U.S. PATENT DOCUMENTS 4,713,808  12/1987  Gaskill et al. ............................ 370/314
5,586,175  12/1996  Hogan et al. ............................ 379/112

*Primary Examiner*—Dang Ton
*Attorney, Agent, or Firm*—Russell B. Miller; Linli L. Golden; Sean English

[57] ABSTRACT

To provide an unique call ID number in a system comprised of a plurality of entities through which a connection may be established, each entity through which a connection can be initiated is capable of assigning a unique number to a new connection. For example a first entity receives a first request to initiate a first connection and assigns a first unique number to said first connection. The first unique number comprises the identity of the first entity, a time at which the first request was received, a distinction of the first request from any other request received at the first entity in a time block during which said first request was received, and an indication of a system with which the first entity is associated.

17 Claims, 2 Drawing Sheets

METHOD AND APPARATUS FOR PROVIDING A CALL IDENTIFIER IN A DISTRUBUTED NETWORK SYSTEM

BACKGROUND OF THE INVENTION

I. Field of the Invention

The present invention relates generally to network systems, and, more particularly, to a network system employing a packet-switched architecture.

II. Description of the Related Art

Mobile wireless telephone service has been in use for many years. In early cellular systems only a limited number of radio channels were available. Through the use of advanced communications techniques, modern radiotelephone systems have a comparatively large number of radio channels thus increasing the total possible number of contemporaneous connections. Thus, the network which supports the system must also be capable of supporting an increased number of connections. Modern radio telephone systems may be cellular telephone systems, wireless private branch exchange systems (PBX), wireless local loop systems (WLL), personal communication systems (PCS), dispatch systems, or satellite based systems. Numerous standards exist for the implementation of modern radiotelephone communications. These standards include Global System for Mobile Communication (GSM) and Code Division Multiple Access (CDMA).

The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference.

In the just mentioned patent, a multiple access technique is disclosed where a large number of mobile telephone system users each having a transceiver communicate through satellite repeaters or terrestrial base stations using CDMA spread spectrum communication signals. By using CDMA communications, the same frequency spectrum can be reused multiple times. The use of CDMA results in a much higher spectral efficiency than can be achieved using other multiple access schemes.

A CDMA system can support a large number of simultaneous connections. Within the system, each call connection must be handled by or routed through a large number of entities within the system. As the call connection is handled by the system, it is advantageous to have an unique number which identifies each active connection in the system. The unique number is typically called a "call ID" and is used to track a connection throughout the system. Call ID's are also useful when attempting to debug a problem in the system. Given the large number of connections and the variety of entities from which such a call connection can originate, the generation of a unique call ID can be quite challenging. The present invention is a method and apparatus for providing a call identifier in a communication system.

SUMMARY OF THE INVENTION

The present invention is a method and apparatus by which a unique number may be assigned to each connection by the entity through which the call connection first enters the system. The call ID contains valuable information rather than being randomly assigned. A call ID can be generated by any entity in the system through which a connection can enter the system or by which a connection can be established. Four variables define the call ID: the system to which the entity belongs; the entry point of the connection; an indication of the time that the connection was initiated; and a count value to distinguish a plurality of connections established in the same time block at the same entity.

The entry point designation prevents two entities from assigning the same number at the same time. The CDMA time provides the uniqueness of call ID numbers generated by a common entity at different times. The count value provides uniqueness of call ID numbers generated by a common entity at the same time. The system identification prevents like entities in different systems from assigning a common number. Thus, every connection in the network has a unique number.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
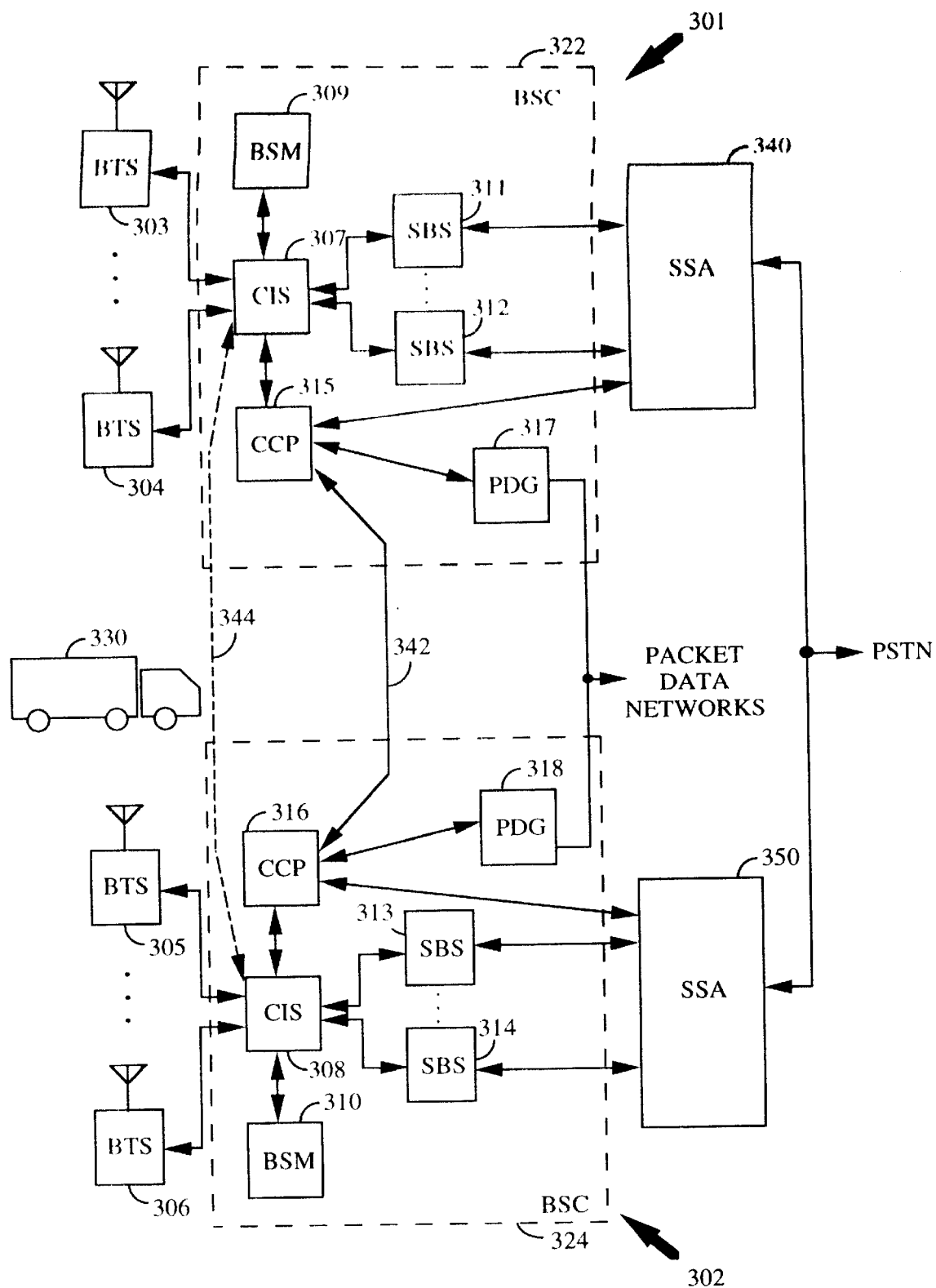
FIG. 1 illustratively represents the configuration of a dual-controller cellular system.

FIG. 1 illustrates the environment in which the present invention may operate. Although networks with three or more systems are also within the scope of the present invention, for clarity the discussion accompanying FIG. 1 describes a dual system network comprised of systems 301 and 302. Also, although the architecture of the preferred embodiment of the present invention is illustrated in a CDMA-type system, in alternative embodiments other communication systems, such as the Global System for Mobile Communications (GSM), may be used. Systems 301 and 302 may be operated by two different cellular radiotelephone carriers.

Systems 301 and 302 are comprised of numerous base station transceiver subsystems, four of which are shown explicitly as base station transceiver subsystems 303–306, for communicating with remote unit 330. Each base station may be partitioned into a number of sectors further increasing the total possible number of contemporaneous connections. Remote unit 330 may be a mobile, portable, personal communication, wireless local loop or other compatible unit capable of communication with base station transceiver subsystems 303–306. Telephone calls are routed by base station transceiver subsystems 303 and 304 between remote unit 330 and base station controller (BSC) 322 of system 301. Telephone calls may also be routed by base station transceiver subsystems 305 and 306 between remote unit 330 and BSC 324 of system 302. BSC 322 and BSC 324 provide connection to the public switched telephone network (PSTN) or a packet data network such as the Internet. BSC 322 and BSC 324 perform functions such as voice encoding and decoding, call authentication, and call coordination.

Once a call has been established, it occupies a signal path from the PSTN through a supplementary services adjunct and BSC to at least one base station. The signal path may change during the call if the call is handed off between base stations due to the movement of the remote unit within the system. If the system employs "hard" handoffs, the remote unit communicates with only one base station at a time. To support a hard handoff, a second fixed path is established to carry the call. If the system employs so-called "soft" handoffs, two or more paths are established simultaneously during the handoff process, thereby requiring multiple paths to be maintained through a plurality of base stations until the soft handoff is complete. A method and system for providing a communication with a remote unit through more than one base station during the handoff process are disclosed in U.S. Pat. No. 5,267,261, entitled "MOBILE ASSISTED SOFT HANDOFF IN A CDMA CELLULAR COMMUNICATION SYSTEM," issued Nov. 30, 1993 assigned to the assignee of the present invention.

In the preferred embodiment, system data is carried in packets and the equipment used is characterized as having a packet switch architecture. Given the packet switched nature of the signal path through the BSC and base stations, many communication paths share common equipment throughout the system.

Each of base station transceiver subsystems 303–306 is comprised of receivers, transmitters, and modems. Base station transceiver subsystems are also referred to in the art as a cell sites or base stations. Base station transceiver subsystems 303–306 receive and transmit the signals that enable remote unit 330 to communicate with the PSTN or packet data network. In the preferred embodiment, data packets are also used in the wireless connection between base station transceiver subsystems 303–306 and remote unit 330.

On the land side, data packets are transferred to and from base station transceiver subsystems 303–306 by CDMA interconnect subsystem (CIS) 307 and 308, the operation of which is governed by base station managers 309 and 310 and call control processor (CCP) 315 and 316 respectively. CIS 307 also exchanges data packets with a plurality of selector bank subsystems (SBS), two which are shown explicitly as SBS 311 and SBS 312. SBS 311 and SBS 312 are coupled to the public switched telephone network (PSTN) through supplementary services adjunct 340. Supplementary services adjunct 340 controls the routing of signals between the PSTN and the appropriate selector bank subsystems. CIS 308, SBS 313 and SBS 314, and supplementary services adjunct 350 of system 302 each perform the same function as the corresponding elements in system 301.

Referring to system 301, base station transceiver subsystem 303 receives a signal comprised of data packets from remote unit 330 and routes the data packets to CDMA interconnect subsystem 307, which acts as a packet switch. CDMA interconnect subsystem 307 provides the connectivity between many of the subsystems within BSC 322 and BTSs 303 and 304.

Selector bank subsystems 311 and 312 are comprised of a plurality of voice encoders/decoders (vocoders) that compress or decompress voice signals. The data packets received from remote unit 330 on the reverse link are decoded within selector bank subsystem 311 or 312, while a signal from the PSTN to be transmitted to remote unit 330 on the forward link is encoded within selector bank subsystem 311 or 312. The vocoding operation performed in selector bank subsystems 311 and 312 may comprise the variable rate code excited linear prediction (CELP) vocoding algorithm detailed in U.S. Pat. No. 5,414,796 entitled "VARIABLE RATE VOCODER" issued May 9, 1995, and assigned to the assignee of the present invention.

Selector bank subsystems 311 and 312 may also comprise data modems for conversion of encoded signals from remote unit 330 on the reverse link to standard modem tones for the PSTN and for conversion of standard modem tones from the PSTN to packetized data for transmission to remote unit 330 on the forward link. Further information on a data connection within a wireless system can be found in U.S. Pat. No. 5,479,475, entitled "METHOD AND APPARATUS OF PROVIDING COMMUNICATION BETWEEN STANDARD TERMINAL EQUIPMENT USING A REMOTE COMMUNICATION UNIT" issued Dec. 26, 1995 and assigned to the assignee of the present invention.

Call control processor (CCP) 315 is responsible for overall control of call setup and teardown for call connections within the system. CCP 315 also manages remote unit mobility such as registration. CCP 315 allocates the resources within BSC 322 such as SBS allocation based on the service option selected. CCP 315 also tracks and records all call activities such as for billing purposes.

Base station manager 309 performs the functions of configuration management, fault management, performance management and security management. For example, BSM 309 provides a means to configure the network elements including adding and deleting new elements. BSM 309 sets operation parameters and allows viewing of status of registers on the various elements. Fault management includes determining when and where a fault has occurred and performing fault response procedures.

CCP 315 is coupled to packet data gateway 317. Packet data gateway (PDG) 317 provides a direct connection to other packet data networks such as the Internet. CCP 315 is also coupled to CCP 316 of system 302. The connection between CCP 315 and CCP 316 allows system 301 to exchange data packets with the elements of system 302. The coupling between the systems supports handoff between the two systems.

Within system 301, call connections are initiated, or "set-up," by either one of base station transceiver subsystems 303–304 or CCP 315. Each of these call connections is a bi-directional link supporting both a forward and reverse link connection.

When remote unit 330 initiates a call to the PSTN, a receiving base station transceiver subsystem such as base station transceiver subsystem 304 notifies CCP 315. CCP 315 authenticates the call and determines whether processing should continue. If the call is properly authenticated, CCP 315 notifies supplementary services adjunct 340 to allocate a PSTN line. CCP 315 sends a message to a selector bank subsystem such as SBS 312 to allocate a selector element to the call connection. CCP 315 sends a message to the allocated selector element within SBS 312 to establish a link with remote unit 330. The allocated selector element requests a traffic channel assignment from base station transceiver subsystem 304. The allocated selector element notifies CCP 315 of the traffic channel allocated. CCP 315 sends a channel assignment message to remote unit 330 via base station transceiver subsystem 304. When the link is established, the allocated channel element notifies CCP 315 of the successful link completion. All communications now take place between remote unit 330 and selector bank subsystem 312 through CDMA interconnect subsystem 307.

When a call is initiated from the PSTN, a similar procedure is followed. After the PSTN has informed supplementary services adjunct 340 that a call has been received, supplementary services adjunct 340 notifies CCP 315. CCP 315 determines a set of base station transceiver subsystems through which to page the remote unit based on the last known location of the remote unit in system 301. CCP 315 forwards a page message to the set of base station transceiver subsystems. In turn, each base station transceiver subsystem to which the page message is provided issues a page on the wireless link intended for remote unit 330.

Remote unit 330 responds to the page by sending a page response message over an access channel. Assuming that remote unit 330 is within communication range of base station transceiver subsystem 304, base station transceiver subsystem 304 receives the page response message. Base station transceiver subsystem 304 sends a message to CCP 315 indicating reception of the page response from remote unit 330. CCP 315 sends a message to SBS 312 to allocate a selector element. CCP 315 sends a message to the allocated selector element within SBS 312 to establish a link with remote unit 330. The allocated selector element requests a traffic channel assignment from base station transceiver subsystem 304. The allocated selector element notifies CCP 315 of the traffic channel allocation. CCP 315 sends a channel assignment message to remote unit 330 via base station transceiver subsystem 304. When the link is established, the allocated channel element notifies CCP 315 of the successful link completion.

Once the call has been established, it may become necessary to "handoff" the call to another base station transceiver subsystem which may be associated with system 301 or another system such as system 302. The handoff process is facilitated by configuring each of the base station transceiver subsystems 303–306 to continuously transmit a distinguishable pilot signal. Remote unit 330 receives and analyzes the pilot signal from each base station transceiver subsystem within communication range of remote unit 330. Remote unit 330 transmits a pilot signal quality measurement report to the base station transceiver subsystems with which it is communicating indicating the quality of pilot signals as received by remote unit 330.

For example, assume remote unit 330 is in communication with base station transceiver subsystem 304 and is approaching base station transceiver subsystem 305 with which remote unit 330 is not currently in communication. Once the pilot signal quality corresponding to base station transceiver subsystem 305 exceeds a predetermined quality threshold, the selector element within selector bank subsystem 312 handling the call instructs remote unit 330 through base station transceiver subsystem 304 to add base station transceiver subsystem 305 to remote unit's 330 list of "active" base stations. The selector element within selector bank subsystem 312 through CCP 315, CCP 316, and CIS 308, also instructs base station transceiver subsystem 305 to begin reception of signals from remote unit 330.

If soft handoff is supported between the two systems, while communication is established between remote unit 330 and base station transceiver subsystems 304 and 305, data packets from remote unit 330 from both base station transceiver subsystems 304 and 305 may be routed to selector bank subsystem 312 handling the call. Likewise selector bank subsystem 312 routes a copy of each data packet to be transmitted to remote unit 330 to both base station transceiver subsystems 304 and 305. Remote unit 330 may combine the packets received from both base station transceiver subsystems 304 and 305 to produce a high quality signal.

If remote unit 330 continues to move away from base station transceiver subsystem 304 of system 301, the quality of signals exchanged between remote unit 330 and system 301 begins to degrade. After the signal quality falls below a predefined quality threshold, selector bank subsystem 312 issues a command which instructs remote unit 330 to remove base station transceiver subsystem 304 from its list of active base stations. Selector bank subsystem 312 also instructs base station transceiver subsystem 304 to release the traffic channel assigned to remote unit 330. Remote unit 330 remains in communication with selector base subsystem 312, by way of system 302 and base station transceiver subsystem 305.

If soft handoff is not supported between the two systems, communication cannot be established between remote unit 330 and base station transceiver subsystems 304 and 305 simultaneously. Therefore, if remote unit 330 continues to move away from base station transceiver subsystem 304 of system 301, the quality of signals exchanged between remote unit 330 and system 301 begins to degrade and a hard handoff must be performed. Selector bank subsystem 312 sends a signal to CCP 316 via CCP 315 informing it of the proximity of remote unit 330 to base station transceiver subsystem 305. CCP 316 initiates a connection and informs selector bank subsystem 312 when the path is ready. At the appropriate time, selector bank subsystem 312 issues a command which instructs remote unit 330 to remove base station transceiver subsystem 304 from its list of active base stations. Selector bank subsystem 312 also instructs base station transceiver subsystem 304 to release the traffic channel assigned to remote unit 330. Remote unit 330 establishes communication with a selector element within selector base subsystem 313, by way base station transceiver subsystem 305, and CIS 308. Typically the connection for selector bank subsystem 313 to the PSTN remains connected via system 301. For example, selector bank subsystem 313 passes data to supplementary services adjunct 340 via CIS 308, CCP 316, and CCP 315.

In the case of a hard handoff performed as described above, a new call ID may be assigned to the connection by CCP 316 when the request for hard handoff first arrives from selector bank subsystem 312. The new call ID is used by all the entities in system 302. The entities in system 301 which continue to handle the call after the hard handoff may continue to use the original call ID at the same time that the second system is using the new call ID.

More information on the handoff process between two systems can be found in U.S. patent application Ser. No. 08/322,817, entitled "METHOD AND APPARATUS FOR HANDOFF BETWEEN DIFFERENT CELLULAR COMMUNICATIONS SYSTEMS", filed Oct. 13, 1994, U.S. patent application Ser. No. 08/614,562, entitled "METHOD AND APPARATUS FOR PROVIDING CENTRALIZED POWER CONTROL ADMINISTRATION FOR A SET OF BASE STATIONS", filed Mar. 13, 1996, U.S. patent application Ser. No. 08/652,742 entitled "METHOD AND APPARATUS FOR HARD HANDOFF IN A CDMA SYSTEM", filed May 22, 1996, and U.S. patent application Ser. No. 08/652,726, entitled "METHOD AND APPARATUS FOR MEASUREMENT DIRECTED HARD HANDOFF IN A CDMA SYSTEM", filed May 22,1996.

What should be evident by examination of FIG. 1 and the processes described above is that a large number of discrete and distant entities need to communicate packets between one another in an efficient and reliable manner in order to provide connections. In a sense, a connection can be characterized as a set of resources associated with a transaction. It is advantageous to assign each connection a unique number so that the connection can be tracked and identified throughout the system. The number can be used to facilitate communication between the entities. For example, when the SBS notifies the CCP that a call connection is a candidate to enter handoff with another system, the SBS needs to identify that call. The identifying number is called a call ID. The call ID is used to identify the call throughout the system. It does not designate a fixed path. As a remote unit moves within one system, the system performs a series of handoffs from one base station sector to another. Each of these paths may be assigned a unique virtual circuit identifier to identify the path. Each of these paths, however, uses the same call ID so that the call can be tracked throughout the system.

For obvious reasons, the uniqueness of a call ID number is extremely important for the duration of the connection. Once a call has been disconnected, the corresponding call ID number may be reused in association with another connection. In prior art configurations, call ID numbers have been generated by a single entity from a bank of numbers. There are two major disadvantages to such a scheme.

The first disadvantage is that managing a bank of numbers requires substantial memory and overhead. The call ID values in the bank must be designated as taken when the number has been allocated to a connection. When the call is terminated, a second message must be generated so that the number may be designated as available within the bank. Note that if an error occurs, the second message may not be received. Therefore the bank needs to track the amount of time that each number is designated as taken so that a number may be designated as available after the passage of a certain amount of time whether or not the second message is received.

The second disadvantage is that the process of allocating and de-allocating the call ID number adds additional processing to each call connection thus consuming both time and resources for the call ID process. Also, the message which originally requests a call ID number must transverse the system without a call ID number.

The present invention is a method and apparatus by which unique numbers may be assigned to each connection by the entity through which the call connection first enters the system. The call ID of the present invention has the added advantage that the number contains valuable information rather than being randomly assigned.

Figure 2:
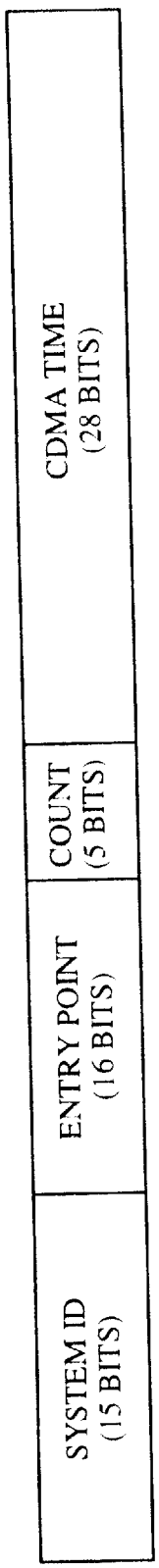
FIG. 2 shows the basic format of the call ID number.

The basic format of the call ID number is given in FIG. 2. In a general embodiment, a call ID can be generated by any entity in the system through which a connection can enter the system or by which a connection can be established. In the preferred embodiment, the call ID is a 64 bit number which can be generated either by a CCP or by a BTS or by any other entity which may cause a remote unit to become an active unit. The first 15 bits identify the system to which the entity belongs. For example in this case, a call connection may be initiated either from system 301 or 302.

The next 16 bits define the entry point. For example, to initiate a call through a base station, a remote unit sends a message on an access channel to the base station. In the preferred embodiment, the entry point indicates which access channel, frequency, and base station sector the remote unit used to initiate the call. If the CCP is the entry point for the call origination from the PSTN, the entry point may reflect the trunk line carrying the signal from the supplementary services adjunct to the CCP. Likewise if the call is from the PDG, the entry point may reflect the trunk line carrying the signal from the PDG.

The next 5 bits and the last 28 bits are an indication of time at which the connection entered the system. The last 28 bits are an indication of CDMA system time. CDMA system time is also used for other purposes within the system. CDMA system time is divided into 80 millisecond (msec.) time blocks. Thus, each 80 msec. time block is assigned a number. Note that CDMA system time may be one of over 268 million values. CDMA system time, although cyclical, does not repeat for about 250 days. The 5 bits preceding the 28 bits of CDMA system time are a count value. During any 80 msec. block, more than one connection may be initiated through one entity. The count value provides a mechanism to distinguish a plurality of connections established in the same time block by the same entity. The 5 digits allow for 32 different connections to be established in one time block.

Thus the entry point designation prevents two entities from assigning the same number at the same time. The CDMA time provides uniqueness for call ID numbers generated by a common entity at different times. The count value provides uniqueness for call ID numbers generated by a common entity in the same time block. The system identification prevents like entities in different systems from assigning a common number. Thus, every connection in the network has a unique number.

Note that if it is not possible to initiate two connections within the same time block, the count field may be eliminated. In some embodiments there may be only one system. In this case, the system identification field can be eliminated.

The area of handoff provides an interesting set of possibilities for the call ID mechanisms. The description of FIG. 1 up to this point has described the connection between system 301 and system 302 with reference to connection 342 between CCP 315 and CCP 316. As noted above depending on the similarities and capabilities of the system, this connection may support either soft or hard handoff. If the link supports hard handoff, the entry of the connection into CCP 316 may be designated an original entry into system 302 and may be given a new call ID value in the second system. The new call ID number could designate the new system identification, a new entry point such as the trunk which carries the signal to the new CCP, a new count designation and system time. Alternatively the call ID could remain completely or partially the same.

There are two methods by which soft handoff might be supported. The first was explained above with reference to connection 342 between CCP 315 and CCP 316. If soft handoff is supported in this manner, a new or partially changed call ID may be generated by the new CCP or the same call ID may be used throughout both systems. The second method of performing soft handoff between two systems is shown in FIG. 1 by dashed connection 344. If system 301 and 302 have a substantially similar architecture and operating system, a connection can be made directly between CIS 307 and CIS 308. In such a case, no new entry point exists and the call ID value is the same in both systems.

The exact number of bits allocated to each field will be dependent on the system and requirements. The number of bits used for the system time indication may be reduced significantly if desired. Because the probability of a call lasting more than one day is extremely low, a time indication could be used that cycled as often as once per day without serious risk of call ID value repetition. The cycle time need only be as long as the expected maximum connection duration of the system. The advantage of having a time value which cycles with a much longer period is that the system may be debugged over a long period of time without repetition of a time value. Obviously, any type of universal time may be used in place of CDMA system time.

There is a great advantage in having a meaningful instead of randomly assigned call ID numbers. One area in which it is particularly useful is in the area of debug. For instance, assume that one is attempting to debug a failure at the BSM. By simply monitoring the call ID numbers, the source and time of entry of each connection is immediately known. If random numbers were assigned, this information may also be available but only by reference to the bank. If the bank stores this type of information, the complexity of the bank is increased.

The information may be quite valuable to analyze failures. By examination of a single entity's statistics, the likelihood of error with relation to the entity which originated the call can be ascertained. Also, a cluster of failures in time can be noted. The relation of the failure rate to the number calls initiated in a common time block can also be determined. If a call fails, equipment may be left "assigned" by accident. Even quite some time after the failure, the equipment can be examined to determine which call it was servicing at the time of the failure.

The principles described herein specifically with relation to a CDMA communication system are generally applicable to any distributed network system. Large network systems are commonly used in many areas to connect a large number of distant entities. The present invention can be used in any environment in which there is a need to mark resources as associated with a connection.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A packet switched network for providing communication between entities comprising:
    a first entity for receiving a first request to initiate a first connection and for assigning a first unique number to said first connection;
    a second entity for receiving a second request to initiate a second connection and for assigning a second unique number to said second connection;
    an interconnection subsystem for transferring packets between said first entity and said second entity;
    wherein said first unique number comprises:
        a first field identifying said first entity from which said first request was received; and
        a second field identifying a time at which said first request was received.

2. The packet switched network of claim 1 wherein said first unique number further comprises a third field distinguishing said first request from any other request received at said first entity in a time block during which said first request was received.

3. The packet switched network of claim 2 wherein said first unique number further comprises a fourth field indicating a system with which said first entity is associated.

4. The packet switched network of claim 1 wherein said first field further identifies a trunk on which said first connection entered said first entity.

5. The packet switched network of claim 1 wherein said first field further identifies a wireless channel on which said first connection entered said first entity.

6. The packet switched network of claim 1 wherein said first entity is a base station and said second entity is call control processor.

7. A method of providing an unique call ID number in a network comprised of a plurality of entities through which a connection may be established comprising the steps of:
    receiving at a first entity a first request to initiate a first connection;
    assigning by said first entity a first unique number to said first connection;
    receiving at a second entity a second request to initiate a connection;
    assigning by said second entity a second unique number to said second connection; and
    using said first and second unique numbers to identify said first and said second connections, respectively;
    wherein said step of assigning said first unique number comprises the steps of:
        identifying said first entity; and
        identifying a time at which said first request is received.

8. The method of claim 7 further comprising the step of distinguishing said first request from any other request received at said first entity in a time block during which said first request is received.

9. The method of claim 8 further comprising the step of indicating a first system with which said first entity is associated.

10. The method of claim 7 further comprising the step of identifying a trunk on which said first connection entered said first entity.

11. The method of claim 7 further comprising the step of identifying a wireless channel on which said first connection entered said first entity.

12. The method of claim 7 wherein said first entity is a base station and said second entity is a call control processor.

13. A packet switched network for providing communication between entities comprising:
    a first entity for receiving a first request to initiate a first connection and for assigning a first unique number to said first connection;
    a second entity for receiving a second request to initiate a second connection and for assigning a second unique number to said second connection;
    an interconnection subsystem for transferring packets between said first entity and said second entity;
    wherein said first and second entities and said interconnection subsystem are members of a first packet switched system, said packet switched network further comprising:
        a second packet switched system having:
            a second interconnection subsystem coupled to said interconnection subsystem of said first system; and
            a third entity wherein when a path is made between an entity of said first packet switched system and said third entity corresponding to said first connection, said first unique number is used to identify said first connection at said third entity.

14. A packet switched network for providing communication between entities comprising:
    a first entity for receiving a first request to initiate a first connection and for assigning a first unique number to said first connection, said first entity is a base station;
    a second entity for receiving a second request to initiate a second connection and for assigning a second unique number to said second connection, said second entity is a call control processor;
    an interconnection subsystem for transferring packets between said first entity and said second entity;

wherein said first and second entities and said interconnection subsystem are members of a first packet switched system, said packet switched network further comprising:
  a second packet switched system having:
    a second call control processor coupled to said second entity; and
    a third entity wherein when a path is made between an entity of said first packet switched system and said third entity corresponding to said first connection, a third unique number is used to identify said first connection within said second packet switched system.

15. A method of providing an unique call ID number in a network comprised of a plurality of entities through which a connection may be established comprising the steps of:
  receiving at a first entity a first request to initiate a first connection;
  assigning by said first entity a first unique number to said first connection;
  receiving at a second entity a second request to initiate a connection;
  assigning by said second entity a second unique number to said second connection;
  using said first and second unique numbers to identify said first and said second connections, respectively;
  said method further comprising the steps of:
    creating a first signal path to support said first connection from said first entity to a third entity such that data packets may be passed therebetween;
    creating subsequently a second signal path to support said first connection from a forth entity to said third entity such that data packets may be passed therebetween simultaneously with the transfer of packets between said first entity and said third entity; and
    using said first unique number to identify said first connection on said first and second signal paths.

16. A method of providing an unique call ID number in a network comprised of a plurality of entities through which a connection may be established comprising the steps of:
  receiving at a first entity a first request to initiate a first connection;
  assigning by said first entity a first unique number to said first connection;
  receiving at a second entity a second request to initiate a connection;
  assigning by said second entity a second unique number to said second connection;
  using said first and second unique numbers to identify said first and said second connections, respectively;
  wherein said first and second entities are members of a first system, said method further comprising the steps of:
    creating a first signal path to support said first connection from said first entity to a third entity such that data packets may be passed therebetween wherein said third entity is a member of a second system;
    coupling data packets over said first signal path through an interconnect subsystem associated with said first system and an interconnect subsystem associated with said second system; and
    using said first unique number to identify said first connection in both said first and second system.

17. A method of providing an unique call ID number in a network comprised of a plurality of entities through which a connection may be established comprising the steps of:
  receiving at a first entity a first request to initiate a first connection;
  assigning by said first entity a first unique number to said first connection;
  receiving at a second entity a second request to initiate a connection;
  assigning by said second entity a second unique number to said second connection;
  using said first and second unique numbers to identify said first and said second connections, respectively;
  wherein said first and second entities are members of a first system, said method further comprising the steps of:
    creating a first signal path to support said first connection from said first entity to a third entity such that data packets may be passed therebetween wherein said third entity is a member of a second system;
    coupling data packets over said first signal path through a coupling entity associated with said first system and a coupling entity associated with said second system; and
    creating a new unique number to identify said first connection in said second system.

* * * * *